No. 671,824. Patented Apr. 9, 1901.
L. N. HORNBECK.
DISTANCE AND ALTITUDE MEASURING INSTRUMENT.
(Application filed June 16, 1900.)
(No Model.) 2 Sheets—Sheet 1.
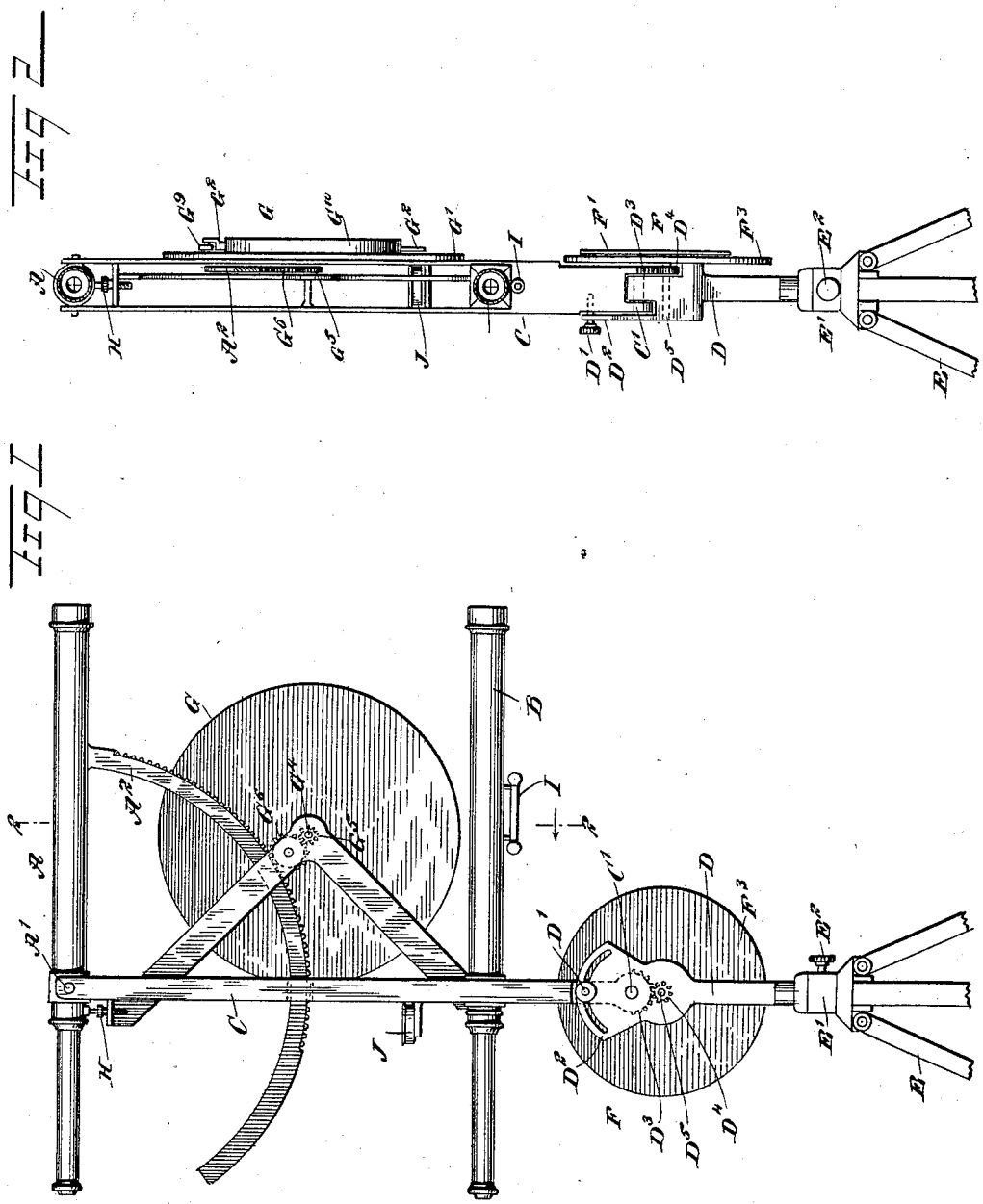
WITNESSES:
INVENTOR
Lewis N. Hornbeck.
BY
ATTORNEYS No. 671,824. Patented Apr. 9, 1901.
L. N. HORNBECK.
DISTANCE AND ALTITUDE MEASURING INSTRUMENT.
(Application filed June 16, 1900.)
(No Model.) 2 Sheets—Sheet 2.
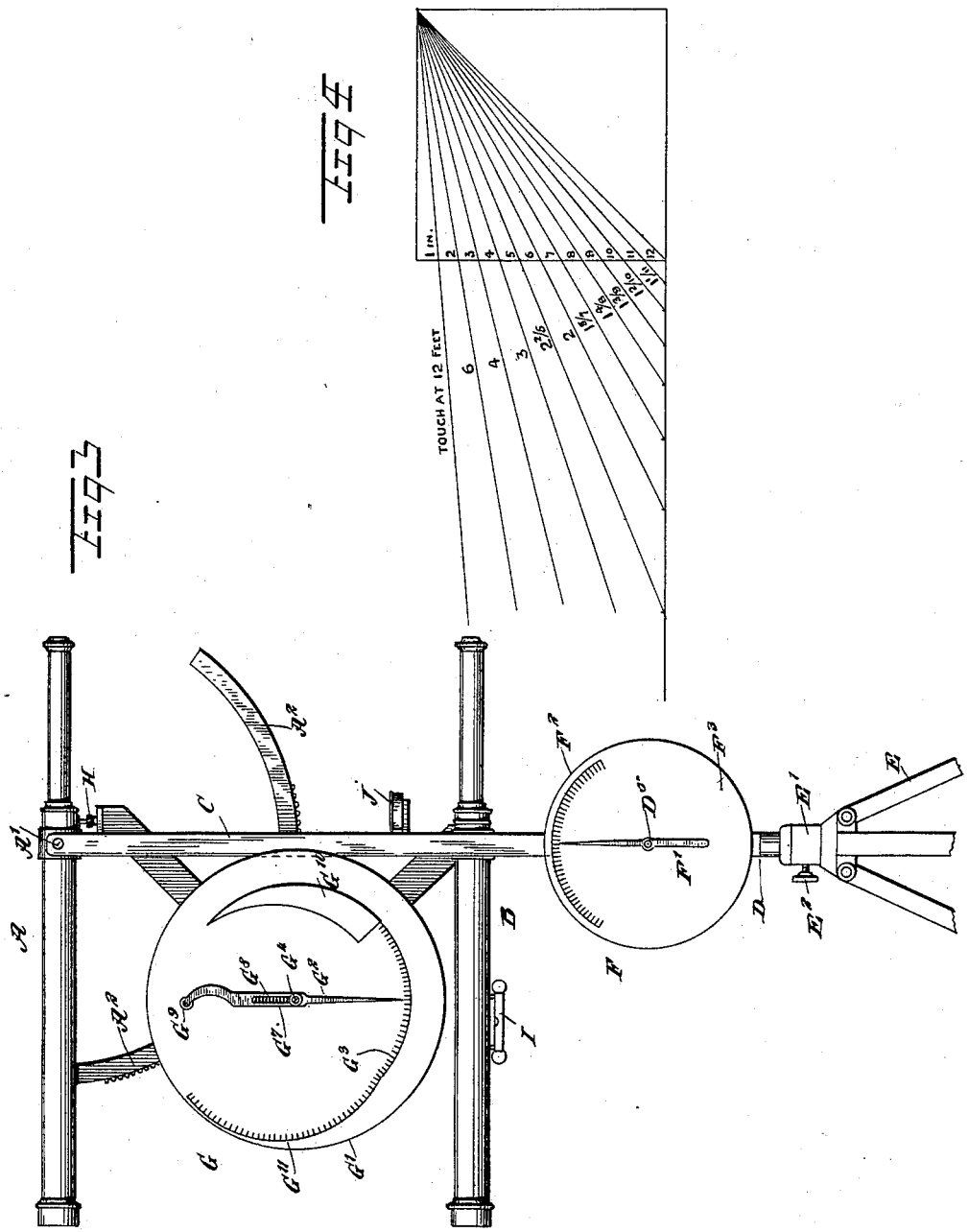
WITNESSES:
INVENTOR
Lewis N. Hornbeck.
BY
ATTORNEYS

UNITED STATES PATENT OFFICE.

LEWIS NEWTON HORNBECK, OF MINCO, INDIAN TERRITORY, ASSIGNOR OF ONE-HALF TO CHARLES B. CAMPBELL, OF SAME PLACE.

DISTANCE AND ALTITUDE MEASURING INSTRUMENT.

SPECIFICATION forming part of Letters Patent No. 671,824, dated April 9, 1901.

Application filed June 16, 1900. Serial No. 20,564. (No model.)

*To all whom it may concern:*

Be it known that I, LEWIS NEWTON HORNBECK, of Minco, Chickasaw Nation, Indian Territory, have invented a new and Improved Distance and Altitude Measuring Instrument, of which the following is a full, clear, and exact description.

The object of the invention is to provide a new and improved combination distance and altitude measuring instrument designed for use on marine vessels and by surveyors, engineers, and other persons to locate distant objects and to give their distance and altitude from the place of observation.

The invention consists of certain parts and details and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement. Fig. 2 is a transverse section of the same on the line 2 2 in Fig. 1. Fig. 3 is a side elevation of the same opposite to that shown in Fig. 1, and Fig. 4 is a diagrammatic view of the improvement.

The improved instrument consists, essentially, of two sighting instruments A and B, preferably in the form of telescopes, located one above the other on a support C in the shape of an upright with a forked upper end, the sighting instrument B being permanently secured to the upright at a right angle thereto and the other sighting instrument A being pivotally connected at A' to the fork members. The telescopes are fitted fore and aft at each lens with cross-wires of great accuracy in order to bring the centers of both on the same object when using the device. The lower end of the support C is pivoted at C' to a post D, mounted to turn and vertically adjustable in a socket E' of the tripod E, on which the entire instrument is mounted. A set-screw E² serves to secure the post D in position in the socket E' after the post has been turned to bring the sighting instruments in the vertical plane extending through the object.

In order to indicate the altitude of a distant object, I provide an altitude-indicator F, arranged to give the rate of altitude for each one hundred feet noted by a distance-indicator, hereinafter described. The altitude-indicator F is controlled from the support C, and is arranged as follows:

The support C, mounted to swing on the pivot C', is adapted to be fastened by a set-screw D' to a segment D² on the post D, and on the pivotal end of said support C is arranged a segmental gear-wheel D³, in mesh with a pinion D⁴, secured on a shaft D⁵, carrying a pointer F' for indicating on the graduation F² of a dial F³, fixed to the post D. The graduation F² indicates the altitude above or below the location of the instrument. It will be seen that when the set-screw D' is loosened and the support C is swung to the right or to the left to bring the sighting instrument B to bear on the object then the movement of the support C to the right or left causes a turning of the pinion D⁴ by the segmental gear-wheel D³, so that the pointer F' is turned to the right or the left from a zero position, according to the distance the support C is swung to the right or left. The gearing is so arranged that the pointer F' indicates the altitude of the distant object above and below the location of the instrument in feet or other suitable linear measurement.

A distance-indicator G is arranged between the sighting instruments A and B and is controlled from the pivoted sighting instrument A, said indicator consisting of a dial G', carried by the support C, a pointer G² indicating on graduations G³ and G¹¹ on the dial the distance in feet or linear measurement. The pointer G² is secured on one end of a transverse shaft G⁴, journaled in suitable bearings in the dial G' and provided at its rear end with a pinion G⁵ in mesh with an intermediate gear-wheel G⁶ in mesh with a segmental gear-wheel or rack A², carried by the sighting instrument A and with the pivot A' as the center. Thus when the sighting instrument A is swung in a vertical plane toward or from the other sighting instrument B then the segmental rack A² rotates the intermediate gear-wheel G⁶, which in turn rotates the pinion G⁵, so that the shaft G⁴ imparts a swinging motion to the pointer $G^2$. The latter now moves to the right or the left, according to the direction in which the sighting instrument A is swung, it being understood that when the sight instrument A is at the angle to the sighting instrument indicating twelve feet the pointer $G^2$ stands at the zero-mark of the graduation $G^3$ on the dial $G'$. The rack $A^2$ is extended beyond the toothed portion to form a support for the telescope A by the extended end resting in a close-fitting case fixed between the forked members of the support C.

The pointer $G^2$ is formed with a slot $G^7$ for the passage of the shaft $G^4$ to allow of moving the pointer across the shaft, the pointer being movably held with one end wall of the slot against the shaft $G^4$ by a spring $G^8$, as shown in Fig. 3. The pointer is provided at the slotted end with a friction-roller $G^9$, adapted to travel on a cam-face $G^{10}$, fixed on the dial $G'$. Thus when the shaft $G^4$ is rotated and the pointer is turned then the friction-roller finally engages the cam-face $G^{10}$ to move the pointer across the shaft $G^4$ and cause it to indicate on the graduation $G^{11}$ of the dial. This arrangement is especially serviceable when using the instrument on objects a considerable distance away from the instrument, for since the pointer moves a much less distance while indicating greater distances it is necessary to have a larger space upon which to make the proper subdivisions on the dial, and consequently by employing the sliding pointer and a dial with two graduations I am enabled to use a much smaller dial.

In order to minutely adjust the sighting instrument A, an adjusting-screw H of any approved construction is provided for the purpose. The lower sighting instrument B is provided with a spirit-level I for properly setting up the instrument with the sighting instrument B in a perfectly horizontal position. A compass J is secured to the support C for giving the direction of any object sighted.

In using the device the sighting instrument B is first brought to bear on the point or object by swinging the support C forward or backward and by turning the rod D in the socket $E'$. When this has been done, the rod D is fastened in place by the set-screw $E^2$ and the support C is fastened in position by the set-screw $D'$. The operator now imparts a swinging motion to the upper sighting instrument A by actuating the adjusting-screw H so as to bring this sighting instrument to bear on the distant object. The distance of the object is now read on the dial $G'$ of the distance-indicator G and the rate of altitude for each one hundred feet for the distance noted by the distance-indicator is read on the dial $F^2$—that is to say, if the distance-indicator stands at one thousand feet and the altitude-indicator stands at ten feet then the altitude of the object would be ten feet for each one hundred feet of distance, or one hundred feet. The sighting instruments (telescopes) should be either one foot or two feet apart from center to center.

The theory for calculating distances is based on the rate of approach of one line toward the other, any approach causing them to touch at some point. If in a foot square the top line is deflected toward the fixed lower line so the fall or approach will be at the rate of one inch downward to one foot outward, then the deflected upper line will touch the fixed lower line at a distance of twelve feet. Any deflection or approach less than an inch will be expressed in fractions of an inch, thus: "$\frac{1}{2}$," "$\frac{1}{4}$," "$\frac{1}{10}$," "$\frac{1}{100}$," "$\frac{1}{1000}$," and so on. Rule: Multiply the denominator of the fraction indicated by twelve. The result will be the distance in feet. (See Fig. 4.) It is now obvious that about all the calculations will fall within the fractions of one inch. The necessary calculations will be made first and the distance marked on the dial $G'$, the greater distances on the extended graduation portion $G^{11}$. The pointer $G^2$, moving over five hundred times the space moved by the sighting instrument, gives space on the dial for marking the distance. A movement of the sighting instrument (telescope) so very slight as to be invisible to the eye alone will be detected by the movement of the pointer and the difference in distance accurately noted. All that now remains is to arrange for the refraction of light in sighting long distances. This can be done best in marking the dial and adjusting the telescopes.

Having thus fully described my invention, I claim as new and desire to secure by Letters Patent—

1. An instrument for measuring distances and indicating the altitude, comprising a support provided with a slotted projection at its upper end, a fixed dial secured to the support, a shaft mounted in the support and provided at its outer end with a pointer indicating on the dial and at its inner end with a pinion, a frame pivoted at its lower end to the support and having at said end a segmental gear meshing with the pinion of the pointer-shaft, a set-screw passing through the slot of the projection of the support into the frame, two sighting instruments mounted in the said frame, one above the other, one of the instruments being fixed and the other movable, a dial carried by the frame, a pointer indicating on the dial, and means for operating the pointer from the movable sighting instrument, substantially as described.

2. A distance-measuring instrument, comprising a support, a sighting instrument fixed thereon and extending at a right angle thereto, a second sighting instrument pivoted on said support in the same vertical plane with the first-named sighting instrument, a distance-indicator controlled from said pivoted sighting instrument, and comprising a segmental gear-wheel on said pivoted sighting instrument, a pointer connected by gearing with said segmental gear-wheel, means for shifting the pointer across its turning shaft, and a fixed dial provided with two graduations on which indicates the said pointer, substantially as shown and described.

3. An instrument for measuring distances and indicating the altitude, comprising a base, a revoluble and vertically-adjustable post carried by the base, a dial fixedly secured to the post, a shaft mounted in the post and provided on its outer end with a pointer indicating on the dial and at its inner end with a pinion, a swinging frame pivoted at its lower end to the post and having at said pivoted end a segmental gear meshing with the pinion of the pointer-shaft, means for locking the swinging frame to the post, two sighting instruments mounted in the swinging frame, one above the other, one of the said instruments being fixed and the other movable, a dial carried by the swinging frame, a pointer indicating on the dial, and means for operating the pointer from the movable sighting instrument, substantially as described.

4. In a distance-measuring instrument, the combination with a support, and sighting instruments mounted in the support one being fixed and the other movable, of a dial provided with two graduations, a shaft, a slotted pointer mounted on the shaft, a spring in the slot of the pointer and holding one end wall of the slot of the pointer against the shaft, a cam on the dial and with which one end of the pointer engages, and means for operating the pointer from the movable sighting instrument, substantially as described.

In testimony whereof I have signed my name to this specification in the presence of two subscribing witnesses.

LEWIS NEWTON HORNBECK.

Witnesses:
J. G. ENGLAND,
J. M. ROBBINS.